United States Patent [19]
Giraudon

[11] 3,876,947
[45] Apr. 8, 1975

[54] ADAPTIVE ANTENNA PROCESSING

[75] Inventor: Claude Giraudon, Antony, France

[73] Assignee: Compagnie Industrielle des Telecommunications Cit-Alcatel, Paris, France

[22] Filed: Jan. 23, 1974

[21] Appl. No.: 435,859

[30] Foreign Application Priority Data

Jan. 23, 1973 France ............................. 73.02273

[52] U.S. Cl. .............. 325/367; 324/77 G; 325/305; 325/371; 325/474; 325/477; 328/165; 343/100 CL

[51] Int. Cl. ........................ H04b 1/12; H04b 15/00

[58] Field of Search ........................... 325/366–369, 325/371, 65, 304, 305, 473–477; 324/77 G, 77 H; 328/165; 343/100 AD, 100 CL, 854

[56] References Cited

UNITED STATES PATENTS

| | | | |
|---|---|---|---|
| 3,652,939 | 3/1972 | Levasseur | 325/367 |
| 3,737,783 | 6/1973 | Oswald et al. | 325/367 |
| 3,784,915 | 1/1974 | Oswald et al. | 325/367 |

*Primary Examiner*—Robert L. Griffin
*Assistant Examiner*—Marc E. Bookbinder
*Attorney, Agent, or Firm*—Craig & Antonelli

[57] ABSTRACT

Self-adapting anti-jamming device having (n + 1) sensors and enabling the restituting of the signal emitted by a source in the presence of n punctiform noise sources, comprising a combination assembly having an adder and n subtractors, an orthonormalization assembly comprising *n* AGC circuits, [$n$ ($n$ − 1)/2] subtractors each combined with a correlation module, an intercorrelation set comprising n correlation modules, an adder and a subtractor.

4 Claims, 9 Drawing Figures

ADAPTIVE ANTENNA PROCESSING

The present invention relates to a self-adapting anti-jamming device having $(n + 1)$ sensors, $n$ being a whole number greater than 1.

It is known that it is possible to manufacture receiver devices having $(n + 1)$ sensors enabling, on a basis of the signals received by these sensors, the restituting of a useful signal emitted by a source in the presence of n jammers, jamming the signal coming from the source.

The useful signal has a narrow band and a frequency fo and may be an ultra-sound signal, radio-electrical signal or any other signal.

Such a device is described in the first addition No. 84,165 to French Pat. No. 1,347,229 by MERMOZ.

In the MERMOZ device, each sensor is followed by an amplifier, a filter having a narrow band centered on $fo$ and an element such as a delay line enabling the difference in phase between the signals coming from the source and being received by the sensors to be compensated.

At the output of the delay lines, $(n + 1)$ delay signal $\Sigma o$, $\Sigma 1$ ..., $\Sigma n$, having the form 93 o $= S(t) + bo(t)$ $\Sigma 1 = S(t) + b1(t)$

.........

$\Sigma n = S(t) + bn(t)$ are obtained, $S(t)$ being the useful signal and $bo, b1, ..., bn$ being noises coming from $n$ jammers.

The MERMOZ receiver device processing the signal $\Sigma o$, $\Sigma 1$..., $\Sigma n$ to extract therefrom $S(t)$ is complicated and requires a very great number of components.

It is known that Messrs. Oswald and Rainsard have simplified the MERMOZ device in the case of devices having two sensors for eliminating the noise coming from one jammer and having three sensors for canceling the noises coming from two jammers.

The receiving device having two sensors is described in French Pat. No. 70 17 868 corresponding to U.S. Pat. No. 3,737,783 and the receiving device having three sensors is described in French Pat. No. 70 22 111 corresponding to U.S. Pat. No. 3,784,915.

The invention aims at generalizing and simplifying the devices of Messrs. Oswald and Rainsard.

The self-adapting anti-jamming device according to the invention enabling the eliminating of the noises emitted by the $n$ punctiform jammers comprises:

$(n + 1)$ sensors, n being a whole number greater than 1, receiving a signal having a narrow band with a central frequency $fo$, coming from a source disturbed by jammers:

Circuits for processing the signals coming from the $(n + 1)$ sensors, comprising amplification means filters having a narrow band centered on $fo$ and delay elements sending out at their outputs $(n + 1)$ signals $\Sigma o$, $\Sigma 1$... $\Sigma n$ having the form: $\Sigma o = S + Bo$ $\Sigma 1 = S + B1$

.........

$\Sigma n = S + Bn$ $S$ being the useful signal coming from the source and $Bo, B1, ..., Bn$ being noises coming from the jammers:

Automatic gain control circuits AGC:

Adders:

Subtractors each comprising a − input and a + input:

Correlation modules, COR, each module COR comprising two nonsymmetrical inputs and an output, a first input M fed by a signal $m$ and a second input U fed by a signal $u$, the output of the module COR supplying a signal having the form $m.\overline{um} + m'.\overline{um'}, m'$ being a signal dephased by $(\pi/2)$ in relation to the signal $m$; and is characterized in that it comprises:

A combination assembly comprising:

An adder J working out the sum of the various signals $\Sigma o$, $\Sigma 1$ ... $\Sigma n$ and supplying a signal $\Sigma$;

$n$ subtractors D1, D2, ..., D$n$ working out the difference between the signal $\Sigma o$ and the signals $\Sigma 1$, $\Sigma 2$, ... $\Sigma n$;

An orthonormalization assembly comprising $n$ channels V1, V2 ... VN for processing signals coming from the subtractors D1, D2 ... D$n$ and supplying $n$ orthonormalized signals T1, T2 ... T$n$;

The first channel V1 comprising an AGC circuit G1 supplying at its output the signal T1;

The input of the AGC circuit G1 being connected up to the output of the subtractor D1;

The second channel V2 comprising a subtractor $D_2^1$, a COR module $C_2^1$ combined with the subtractor $D_2^1$, and AGC circuit G2 supplying at its output the signal T2;

The second V2 comprising a subtractor $D_2^1$, a COR module $C_2^1$ connected with the subtractor $D_2^1$, an AGC circuit G2 supplying at its ouptut the signal T2;

The output of the subtractor D2 being connected to the input U of the COR module $C_2^1$ and to the + input of the subtractor $D_2^1$;

The output of the COR module $C_2^1$ being connected to the − input of the subtractor $D_2^1$;

The input of the AGC circuits G2 being connected to the output of the subtractor $D_2^1$;

The p$th$ channel V$p$, $p$ being a whole number which may assume all the whole-number values from 2 to $n$, comprising $(p - 1)$ subtractors, $D_p^1$ ..., $D_p^j$ ..., $D_p^{p-1}$, $j$ being a whole number which may assume all the values from 1 to $p - 1$, $(p - 1)$ COR modules $C_p^1$, ..., $C_p^j$ ..., $C_p^{p-1}$ connected with the $(p - 1)$ subtractors $D_p^1$, ..., $D_p^j$ ...., $D_p^{p-1}$, an AGC circuit G$p$ supplying the signal T$p$;

The output of the subtractor D$p$ being connected to the inputs U of the COR modules $C_p^j$ and to the + input of the subtractor $D_p^1$;

The output of the subtractor $D_p^{j-1}$ being connected to the + input of the subtractor $D_p^j$, The output of the subtractor $D_p^{p-2}$ being connected to the + input of the subtractor $D_p^{p-1}$;

The output of the COR module $C_p^j$ being connected to the − input of the subtractor $D_p^j$;

The output of the subtractor $D_p^{p-1}$ being connected to the input of the AGC circuit G$p$;

The nth channel V$n$ comprising $n - 1$ subtractors $D_n^1$, ..., $D_n^j$, ..., $D_n^{n-1}$, $j$ being a whole number which may assume all the values from 1 to $n - 1$;

$(n - 1)$ COR modules $C_n^1$, ... $C_n^j$, ... $C_n^{n-1}$ connected with the $(n - 1)$ subtractors $D_n^1$, ..., $D_n^j$, ..., $D_n^{n-1}$, an AGC circuit G$n$ supplying the signal T$n$;

The output of the subtractor Dn being connected to the inputs U of the COR modules $C_n^j$ and to the + input of the subtractor $D_n^1$;

The output of the subtractor $D_n^{j-1}$ being connected to the + input of the subtractor $D_n^j$;

The output of the subtractor $D_n^{n-2}$ being connected to the + input of the subtractor $D_n^{n-1}$;

The output of the COR module $C_n^j$ being connected to the + input of the subtractor $D_n^j$;

The output of the subtractor $D_n^{n-1}$ being connected to the input of the AGC circuit $G_n$;

The AGC circuit G1 being connected to the inputs M of the $n-1$ COR modules $C_2^1, ..., C_{r1}^1 ... C_n^1$, $r1$ assuming all the whole-number values from 2 to $n$;

The AGC circuit $G_k$ ($k$ being able to assume all the whole-number values from 1 to $n-1$) being connected to the inputs M of the $n-k$ COR modules $C_{k+1}^k, ..., C_{rk}^k$, $rk$ being able to assume all the whole-number values from $(k+1)$ to $n$, The AGC circuit $G_{n-1}$ being connected to the input M of the COR module $C_n^{n-1}$;

An intercorrelation assembly comprising:

$n$ COR modules C1, C2, ... $Cp$ ... $Cn$ each receiving on its input M the signal T1, T2 ..., $Tp$ ... $Tn$ and on its input U the signal $\Sigma$;

An adder J' working out the sum of the output signals of the $n$ COR modules C1, C2 ... $Cp$ ... $Cn$;

A subtractor D whose − input is connected to the output of the adder B, whose + input receives the signal $\Sigma$ and whose output supplies the useful signal $(n+1)$ S.

The device according to the invention may be used in all detection systems for eliminating the sources of noise and more particularly in sonars.

The descriptions of the following figures given with reference to the accompanying drawings will make it easier to understand how the invention may be implemented.

FIG. 1 shows the anit-jamming device having two sensors of a known type;

FIGS. 2*a*, 2*b*, and 2*c* are explanatory diagrams of the operation of the anti-jamming device in FIG. 1;

Figure 1:
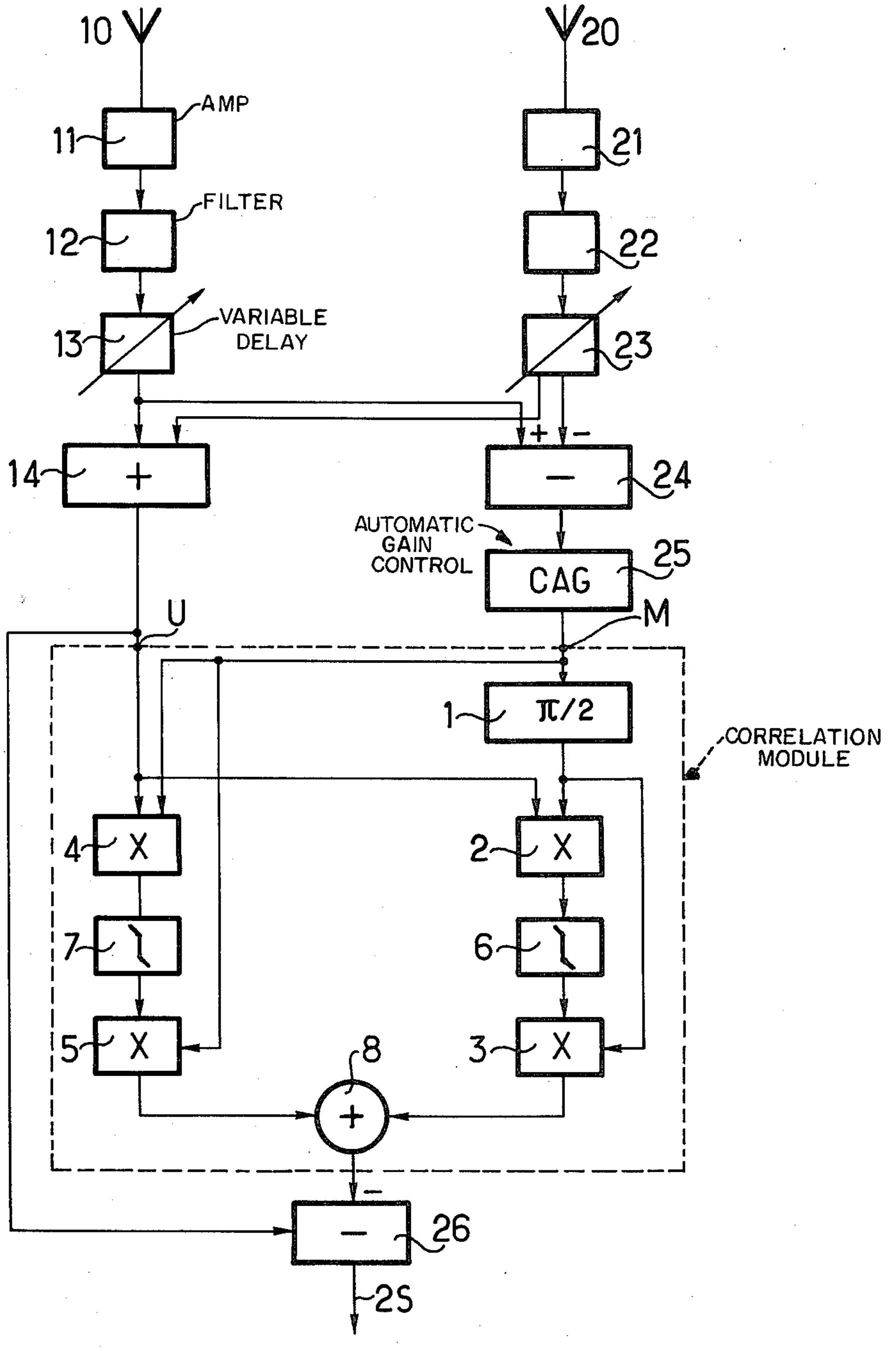

FIG. 1 shows the known anti-jamming device comprising a network of aerials having two sensors 10 and 20. That device is described in greater detail in French Pat. No. 70 17 868 and only the elements required for understanding the invention will be mentioned again here. In that device, the sensor 10 is followed by an amplifier 11, a filter 12 and a variable delay line 13.

The sensor 20 is followed by an amplifier 21, a filter 22 and a variable delay line 23.

The outputs of the variable delay lines 13 and 23 are connected to the inputs of an adder 14.

The anti-jamming device comprises, also, a subtractor 24 having two inputs, a − input and a + input, the signal applied to the − input being subtracted from the signal applied to the + input.

The output of the delay line 13 is connected to the + input of the subtractor 24 and the output of the delay line 23 is connected to the − input of the subtractor 24.

The output of the subtractor 24 is connected to the input of an automatic gain control circuit 25 supplying a signal $m$.

The output adder 14 supplying a signal $u$ and the output of the AGC circuit are connected to the two inputs U and M of a correlation module COR whose output is connected to the − input of a subtractor 26 whose + input is connected to the output of the adder 14.

The module COR comprises a dephaser 1 dephasing by an angle of $(\pi/2)$ whose input is connected to the input M, a first and a second multiplier 2 and 3 whose first input is connected to the output of the dephaser 1, a third and a fourth multiplier 4 and 5 whose first input is connected to the input M. The second input of the multipliers 2 and 4 is connected to the input U of the module COR. The module COR comprises, also, a first and a second integrator 6 and 7 and an adder 8.

The integrator 6 is connected up between the output of the multiplier 2 and the second input of the multiplier 3.

The integrator 7 is connected up between the output of the multiplier 4 and the second input of the multiplier 5.

The adder 8 is connected to the outputs of the multiplier 3 and 5. A signal $m$ is applied to the input M and a signal $u$ is applied to the input U. A signal m' dephased by $(\pi/2)$ in relation to $m$ is obtained at the output of the dephaser 1.

The multiplier 2 calculates the product $u.m'$ of the instantaneous amplitudes of the signals $u$ and $m'$ which, after integration in the integrator 6, supplies the signal $\overline{u.m'}$. The signal $\overline{u.m'}$ is a continuous or slowly variable signal whose magnitude is equal to the average value of the product $u.m'$. Likewise, the signal $\overline{u.m}$ is obtained at the output of the integrator 7.

The multiplier 3 supplies the signal $(m'.\overline{um'})$ obtained by multiplication of the signals $m'$ and $\overline{um'}$ and the multiplier 5 supplies the signal $(m.\overline{um})$.

The output signal of the adder 8 has the form $(m'.\overline{um'}) + (m.\overline{um})$.

In the subtractor 26, the signal $(m'.\overline{um'}) + (m.\overline{um})$ is subtracted from the signal $u$ and the useful signal 2 S is obtained at the output.

Figure 2A:
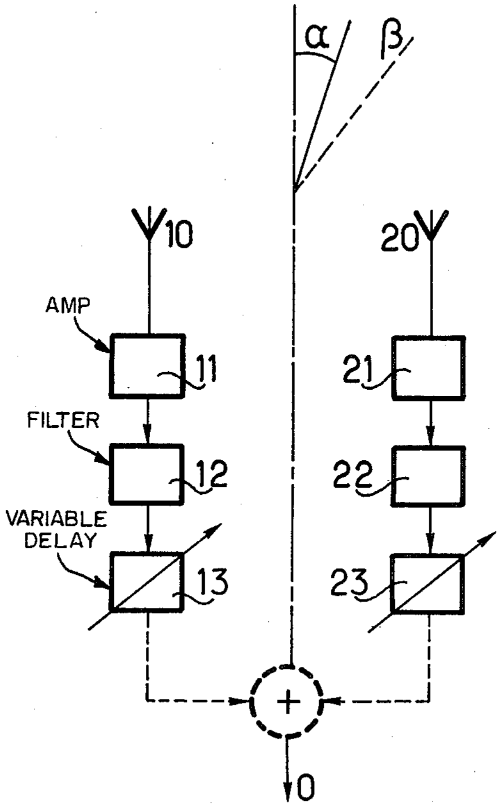
Figure 2B:
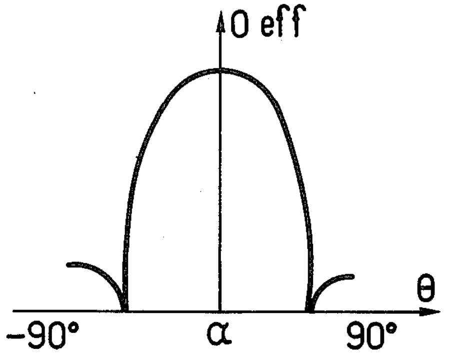
Figure 2C:
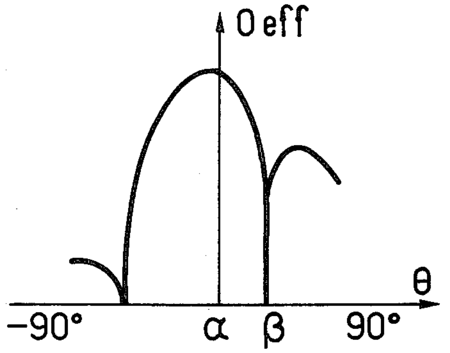

The directivity function of the network of aerials having two sensors (FIG. 2*a*) is shown in FIG. 2*b*.

The directivity function expresses the average amplitude 0 eff $(\sigma)$ with which a signal having a plane wave structure as a function of the direction of arrival of the signal relative to the axis of the aerial is rendered by the network of aerials; that function $\sigma$ eff has two zeros.

In the case where a simple sum is effected behind the delay lines 13 and 23 whose delay has been adjusted to listen in a determined direction forming an angle $\alpha$ with the axis of the aerial, a signal coming from the listening direction $\alpha$ is received with a maximum amplitude. The channel $\alpha°$ has thus been formed.

The filters 12 and 22 have a narrow band and are centered on a frequency $fo$.

By affecting the delays of the variable delay lines 13 and 23, the listening direction of the network of aerials having two sensors may be changed.

The useful signal coming from a punctiform source situated in space, having a frequency of $fo$, has a plane wave structure whose direction of propagation must coincide with the listening direction to ensure the best receiving.

When that coincidence has been produced, the signals $\Sigma o$ and $\Sigma 1$ obtained at the output of the delay lines 13 and 23 comprise a useful component having the same amplitude and the same phase and have the form:

$$\Sigma o = S + Bo$$

$$\Sigma 1 = S + B1$$

$S$ being the useful signal coming from the source and $Bo$ and $B1$ being noises coming from the jammers.

This is what is done if the required signal comes from a direction coinciding with the direction $\alpha°$.

If, besides, the required signal coming from the direction $\alpha°$, there is an interference signal or noise coming from a punctiform jammer coming from a direction $\beta°$ different from $\alpha°$, that noise is rendered by the aerial with an amplitude proportional to the value $0\ \alpha(\beta)$ of the directivity function $0\alpha$ for $\beta$. Now, $0\alpha\ (\beta)\ \leqslant\ 0\alpha\ (\alpha)$.

The weakening may be insufficient to enable the receiving without hindrance of the signal coming from the direction $\alpha°$.

The anti-jamming device having two sensors is adapted to the noise coming from $\beta°$ by measuring its intercorrelation coefficients in order to cancel it subsequently. From the directivity point of view, this is the equivalent of displacing a zero of the directivity function up to the angle $\beta$.

The anti-jamming device having two sensors cancels completely the interferences which are completely correlated on the two sensors. Moreover, if the interference signal changes direction and comes from a direction $\tau°$, the device is adapted and the zero of the curve of directivity is displaced up to $\tau$.

The anti-jamming device, even in the presence of noises coming from jammers having any space structure effects an optimum aerial processing and enables the best signal-to-noise ratio which it is possible to obtain with an aerial having two sensors.

According to a variant of the anti-jamming device having two sensors comprising variable delay lines, P similar anti-jamming devices having in common only the two sensors, the amplifiers and the filters and whose 2P delay lines which follow are adjusted so as to fix the listening in only one direction, different for each device, may be used. It is, therefore, possible to listen simultaneously in P directions.

Figure 3:
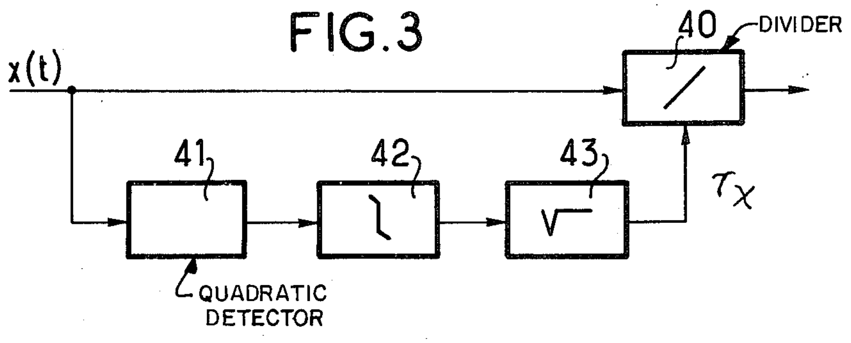
FIG. 3 shows diagrammatically conventional automatic gain control circuit.

FIG. 3 shows a conventional automatic gain control circuit AGC. That circuit comprises a divider 40 receiving on one of its inputs a first signal $x(t)$ to be divided by a second signal $\tau_x$ applied to the second input of the divider. The second signal $\tau_x$ is worked out on a basis of the said first signal by a chain comprising in series a quadratic detector 41 supplying the signal $x(t)^2$, an integrator 42 at an instant T supplying a signal $$\tau_x^2 = \frac{1}{T}\int_0^T x(t)^2\,dt$$

and a square root extractor 43 supplying the second signal $\tau_x$.

Figure 4:
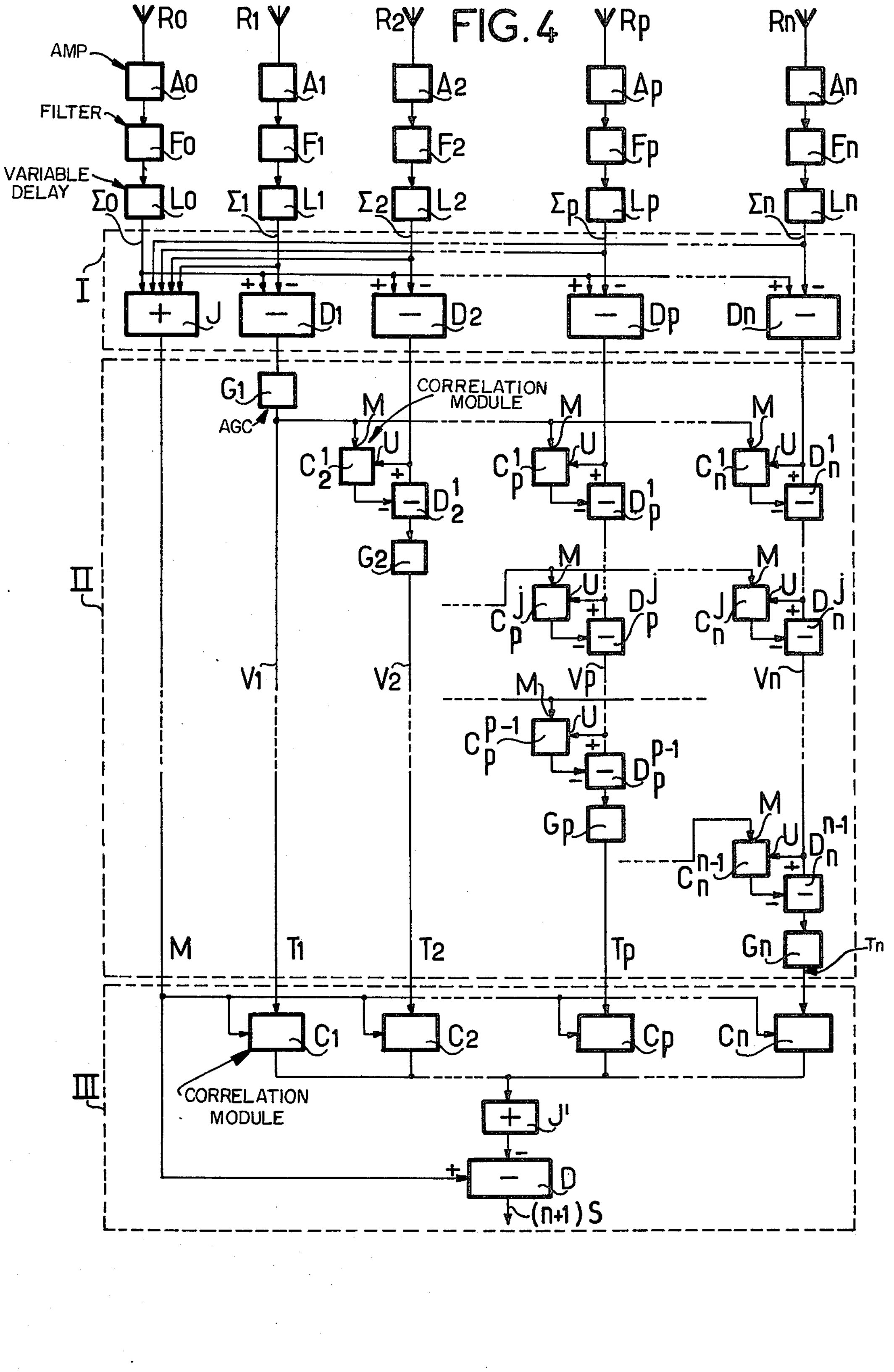
FIG. 4 shows the anti-jamming device having $(n+1)$ sensors according to the invention.

FIG. 4 shows the anti-jamming device according to the invention comprising $(n + 1)$ sensors R*o*, R1 ... R*n* each followed by an amplifier A*o*, A1 ... A*n*, a filter F*o*, F1 ... F*n* and a variable delay line L*o*, L1 ... L*n*.

The sensors R*o*, R1 ... R*n* are equidistant and are arranged in a straight line and the delays have been adjusted so that the listening direction coincides with the direction from which comes the useful signal coming from a punctiform source.

At the output of the delay lines are obtained n signals having the form:

$\Sigma\, o = S + Bo$
$\Sigma\, 1 = S + B1$
..........
$\Sigma\, n = S + Bn$

*S* being the useful signal coming from the source and B*o*, B1, ... B*n* being noises coming from jammers.

The anti-jamming device comprises a combination assembly I consisting of an adder J working out the sum $\Sigma$ of the signals $\Sigma o$, $\Sigma 1$ ... $\Sigma n$ and n subtractors D1, D2 ... D*n*, working out the difference between the signal $\Sigma o$ and the signals $\Sigma 1$, $\Sigma 2$ ... $\Sigma n$.

The anti-jamming device comprises also an orthonormalization assembly II comprising $n$ channels V1, V2 ... V*n* for the processing of the signals coming from the subtractor D1, D2 ... D*n* and supplying n orthonormalized signals T1, T2 ... T*n*.

The first channel V1 comprises an AGC circuit G1 supplying at its output the signal T1, the input of the AGC circuit G1 being connected to the output of the subtractor D1.

The second channel V2 comprises a subtractor $D_2^1$ a COR module $C_2^1$ connected with the subtractor $D_2^1$, an AGC circuit G2 supplying at its output the signal T2.

The output of the subtractor D2 is connected to the input U of the COR module $C_2^1$ and to the + input of the subtractor $D_2^1$.

The output of the COR module $C_2^1$ being connected to the - input of the subtractor $D_2^1$.

The input of the AGC circuit G2 being connected to the output of the subtractor $D_2^1$.

The $p^{th}$ channel V*p*, *p* being a whole number which may assume all the values from 2 to $n$ comprises $(p - 1)$ subtractors, $D_p^1$ ... $D_p^j$..., $D_p^{p-1}$, $j$ being a whole number which may assume all the values from 1 to $p$ - 1, ($p$-1) COR module $C_p^1$, ... $C_p^j$ ... $C_p^{p-1}$ connected with the ($p$-1) subtractors $D_p^1$..., $D_p^j$ ... $D_p^{p-1}$, AGC circuit G*p* supplying the signal T*p*.

The output of the subtractor D is connected to the inputs U of the COR modules $C_p^j$ at the + input of the subtractor $D_p^1$.

The output of the subtractor $D_p^{j-1}$ is connected to the + input of the subtractor $D_p^j$.

the output of the subtractor $D_p^j$ is connected to the + input of the subtractor $D_p^{p-1}$.

the output of the COR module $C_p^j$ is connected to the - input of the subtractor $D_p^j$.

The output of the subtractor $D_p^{p-1}$ being connected to the input of the AGC circuit G*p*.

The $n^{th}$ channel V*n* comprises ($n$- 1) subtractors $D_n^1$... $D_n^j$, ..., $D_n^{n-1}$, $j$ being a whole number which may assume all the values from 1 to $n$—1), ($n$—1) COR modules $C_n^1$, ..., $C_n^j$, ... $C_n^{n-1}$ connected with the ($n$—1) subtractors $D_d^1$...$D_n^j$...$D_n^{n-1}$, an AGC circuit G*n* supplying the signal T*n*.

the output of the subtractor D*n* being connected to the inputs U of the COR modules $C_n^j$ and to the + input of the subtractor $D_n^1$, The output of the subtractor $D_n^{j-1}$ is connected to the + input of the subtractor $D_n^j$.

The output of the subtractor $D_n^{n-2}$ is connected to the + input of the subtractor $D_n^{n-1}$.

The output of the COR module $C_c^j$ is connected to the - input of the subtractor $D_n^j$.

The output of the subtractor $D_n^{n-1}$ is connected to the input of the AGC circuit G*n*.

the AGC circuit G1 is connected to the input M of the $n - 1$ COR modules $C_2^1$, ... $C_{r1}^1$... $C_n^1$, $r1$ assuming all the whole number values from 2 to $n$.

The AGC circuit G*k* ($k$ being able to assume all the whole number values from 1 to $n - 1$) is connected to the inputs M of the $n - k$ COR modules $C_{k+1}^k$, ... $C_{rk}^k$, $C_n^{k}$, $rk$ being able to assume all the whole number values from $(k+1)$ to $n$.

The AGC circuit G $n-1$ is connected to the input M of the COR module $C_n^{n-1}$.

The anti-jamming device comprises, moreover, an intercorrelation assembly III comprising: $n$COR modules C1, C2, ... C$p$ ... C$n$, each receiving on its input M the signal T1, T2 ..., T$p$ ... T$n$and on its input U the signal $\Sigma$, and adder J' working out the sum of the output signals of the $n$ COR modules C1, C2 ... C$p$ ... C$n$ and a subtractor D whose − input is connected to the output of the adder J', whose + input receives the signal $\Sigma$ and whose output supplies the useful signal $(n+1)S$.

By means of the device according to the invention, $n$ zeros of the directivity curve of the network of aerials having $(n+1)$ sensors may be moved and hence the noises coming from the $n$ punctiform jammers may be canceled. In the presence of noises coming from jammers having a nondescript space structure, the device according to the invention effects an optimum serial processing and enables the obtaining of the best signal-to-noise ratio possible with an aerial having $(n+1)$ sensors.

Figure 5:
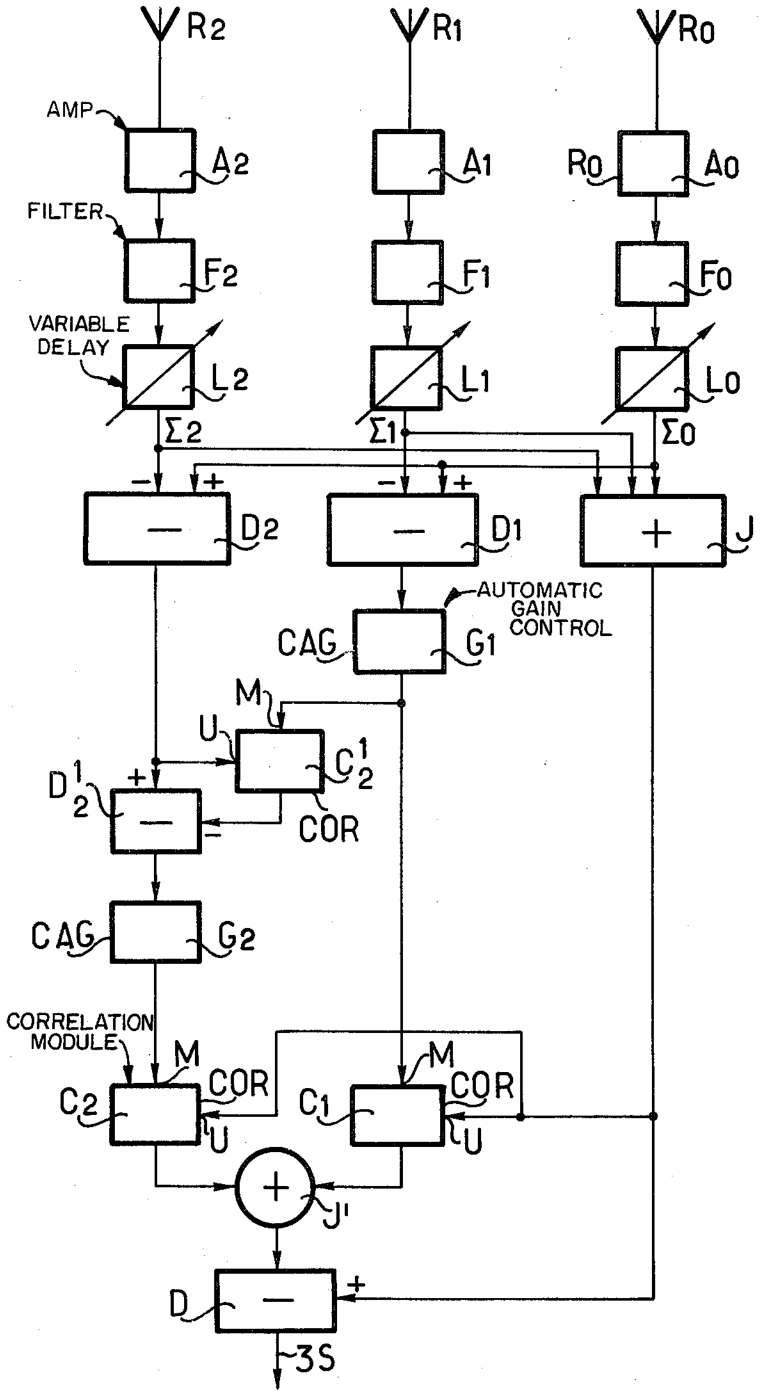
FIG. 5 shows the anti-jamming device having three sensors according to the invention.

FIG. 5 shows the anti-jamming device according to the invention having three sensors, each of the sensors R$o$, R1, R2 is followed by an amplifier A$o$, A1, A2, by a filter centered on a frequency $fo$, F), F1, F2 and by a variable delay line L9, L1, or L2.

The delay lines L0, L1, L2 send out to their outputs three signals $\Sigma o$, $\Sigma 1$, $\Sigma 2$ having the form:

$\Sigma o = S + Bo$ $\Sigma 1 = S + Bl$ $\Sigma 2 = S + B2$ $S$ being the useful signal coming from the source and B$o$, B1, B2 being noises coming from the jammers.

The anti-jamming device comprises an adder J carrying out the sum of the three signals $\Sigma o$, $\Sigma 1$, $\Sigma 2$ and two subtractors D1 and D2 working out the difference between the signal $\Sigma o$ and the signals $\Sigma 1$ and $\Sigma 2$.

The output of the subtractor D1 is applied to the input of an AGC circuit G1 and the output of G1 is applied to the inputs M of a COR module C1 and of a COR module $C_2^1$.

The output of the subtractor D2 is applied to the input U of the COR module $C_2^1$ and to the + input of a subtractor $D_2^1$, the − input of the subtractor $D_2^1$ being connected to the output of the COR module $C_2^1$.

The output of the subtractor $D_2^1$ is connected to the input of an AGC circuit G2 whose output is connected to the input M off a COR module C2.

The inputs U of the COR module C1 and C2 are connected to the output of the adder J. The outputs of the COR modules C1 and C2 are connected to the inputs of an adder J' whose output is connected to the − input of subtractor D.

The + input of the subtractor D is connected to the output of the adder J and the output of the subtractor D supplies the useful signal 3S.

The anti-jamming device having three sensors according ot the invention therefore comprises, starting from the delay lines: two AGC circuits, three COR modules, two adders and four subtractors.

The anti-jamming device having three sensors such as described in French Pat. No. 70 22 111 corresponding to U.S. Pat. No. 3,784,915 comprises a dephaser, three adders, five subtractors, six AGC circuits, two COR modules having their adder in common.

The anti-jamming device having three sensors according to the invention therefore makes it possible to save four AGC circuits, a subtractor and a dephaser but requires an extra COR module.

As the square root extractor, the quadratic detectors, the multipliers and dividers are hardware devices whose complexity is much greater than the summing machines and the subtractors, it will be seen that a COR module represents much less hardware than four AGC circuits, so much that the anti-jamming device having three sensors according to the invention and even more the device having n+ 1 sensors, is an improvement in relation to the device having three sensors according to French Pat. No. 70 22 111 corresponding to U.S. Pat. No. 3,784,915.

In the case where the noises are gaussian, it is possible to simplify, in the anti-jamming device according to the invention, the AGC circuits and the COR module and therefore to reduce the size of the hardware.

Figure 6:
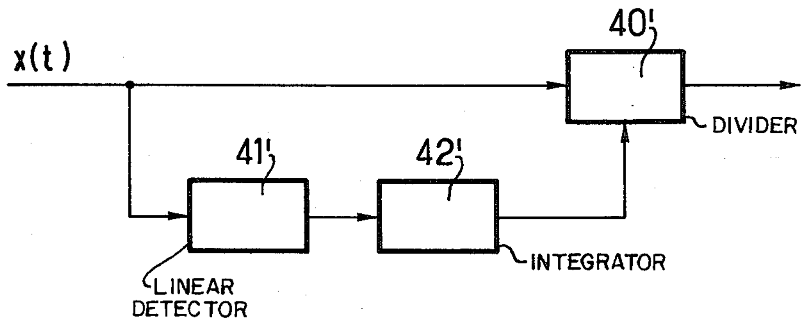
FIG. 6 shows a simplified AGC circuit.

FIG. 6 shows a simplified automatic control AGC circuit which may be used in the anti-jamming device according to the invention when the noises are gaussian.

The simplified AGC circuit comprises a divider 40' receiving on an input a first signal $x(t)$ and on the other input a sound signal calculated on a basis of the said first signal by a linear detector 41' followed by an integrator 42'.

Figure 7:
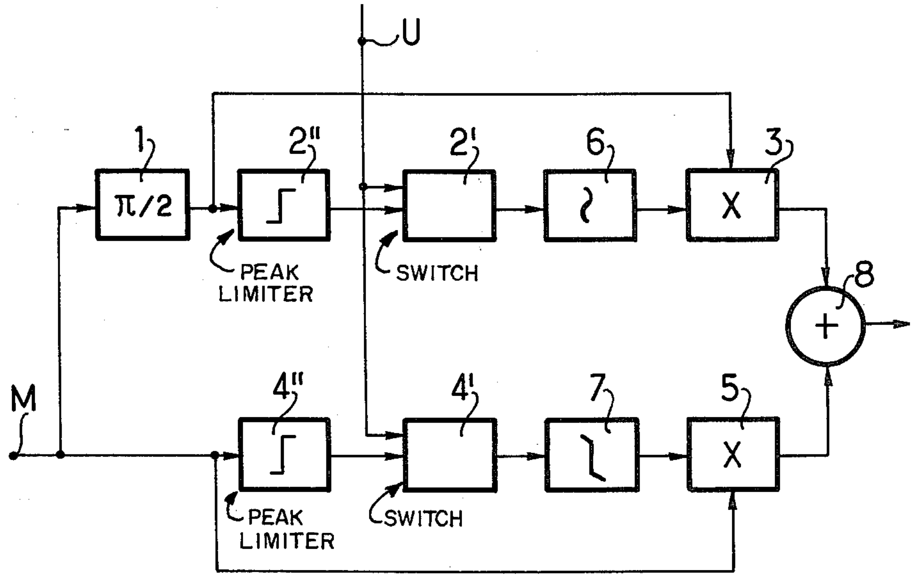
FIG. 7 shows a simplified COR module.
Figure 4:
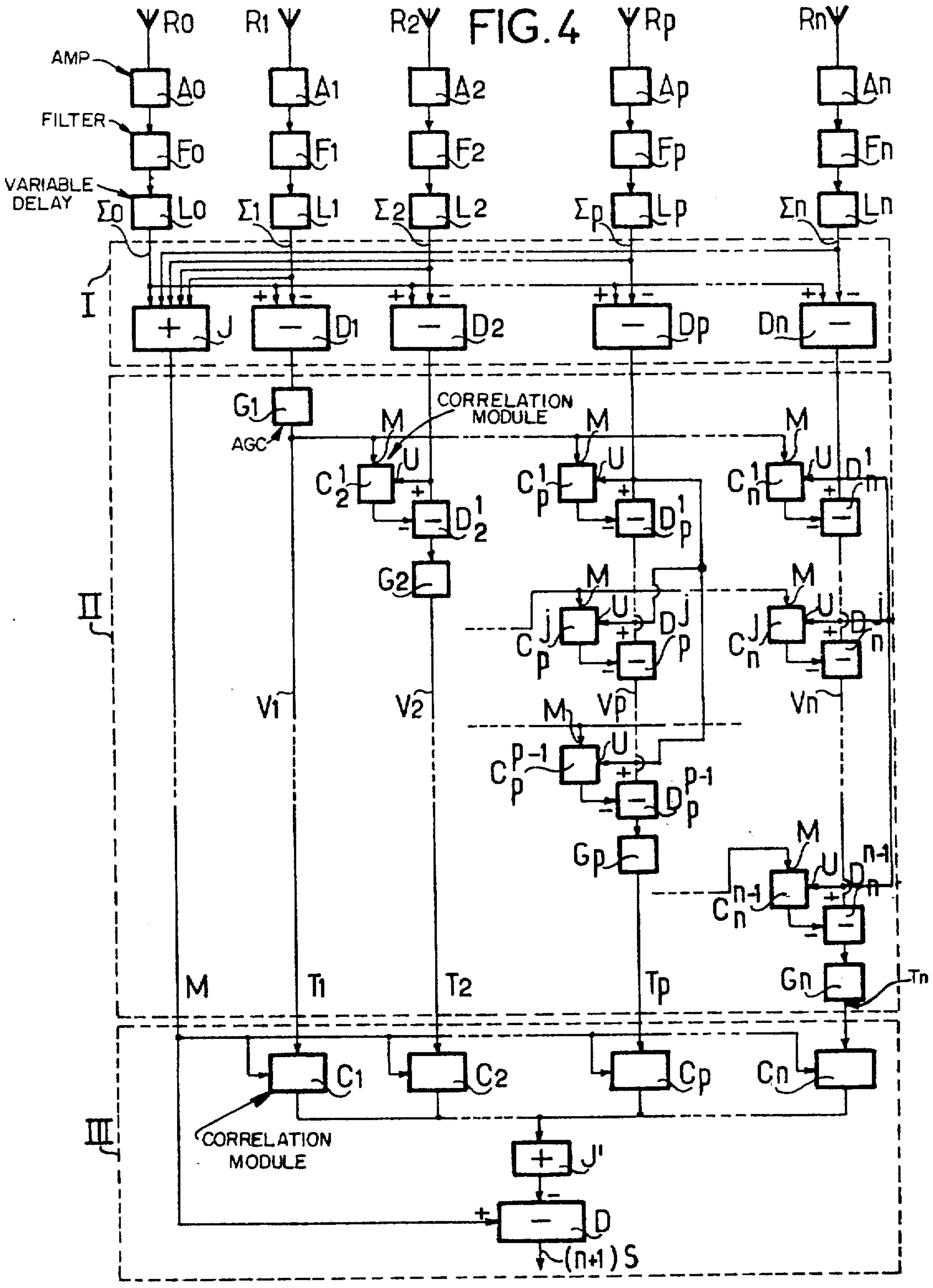

FIG. 7 shows a simplified COR module which may be used in the anti-jamming device according to the invention when the noises are gaussian.

The simplified COR module comprises the same elements as the COR module shown in FIG. 1, with the exception of the first and third multipliers, which are replaced by switches 2' and 4' and comprise two peak limiters 2'' and 4'' arranged before one of the inputs of each switch so as to limit the peaks of the analog signals coming from the input M.

The peak limiters transform the said analog signals into binary signals representative of the sign of the analog signals.

The simplified COR module comprises, like the COR module shown in FIG. 1, the two multipliers 3 and 5, the integrators 6 and 7, the dephaser 1 dephasing by an angle of $(\pi/2)$ and the adder 8.

It is possible, instead of using the variable delay lines in the anti-jamming devices according to the invention, to take a number P of similar anti-jamming devices having in common only the $(n+1)$ sensors and the amplifiers and filters which follow them and whose delay lines are adjusted permanently differently for each device so that it be possbile to listen in P different directions.

It is also possible to arrange the $n+1$ sensors in a nondescript way provided that the variable delay lines be adjusted so as to receive the signals coming from a given direction with the maximum of sensitivity.

Although the anti-jamming devices which have just been described appear to afford the greatest advantages, it will be understood that various modifications may be made thereto without going beyond the scope of the invention, it being possible to replace certain of their elements by other elements capable of providing the same function or an equivalent technical function therein.

What is claimed is:

1. A self-adapting anti-jamming device receiving a signal having a narrow band with a central frequency coming from a signal source disturbed by a plurality of jammers, comprising ($n$ +1) sensors receiving said signal, where $n$ is an integer greater than 1, a plurality of amplifiers each connected to a respective sensor, a plurality of narrow band filters having a pass band centered on said central frequency and each connected to the output of a respective amplifier, a plurality of delay elements each connected to the output of a respective filter and providing at the output thereof the sum of the useful portion of said signal from said signal source and the noise from a respective one of said jammers, a first adder having inputs connected to the outputs of all of said delay elements, $n$ first subtractors each having a positive input connected in common to the output of one of said delay elements and a negative input connected to the output of a respective one of the other delay elements.

a sequence of channels each connected to the output of a respective one of said first subtractors, the first channel of the sequence comprising an automatic gain control circuit and each other channel of the sequence comprising a number of serially connected subcombinations equal to the number of the channel in the sequence less one in series with an automatic gain control circuit, said subcombinations each comprising a second subtractor having a positive input receiving the output of its respective first subtractor and a negative input receiving the output of a first correlation unit having one input connected to the positive input of said second subtractor and another input connected to the output of an automatic gain control circuit in a respective one of the preceeding channels of the sequence, said automatic gain control circut in each of said other channels has an input connected to the output of the second subtractor in the last of said serially connected subcombinations and a plurality of second correlation units each having one input connected in common to the output of said first adder and a second input connected to the output of a respective channel, a second adder connected to the outputs of said second correlation units, and a third subtractor having a possible input connected to the output of said first adder and a negative input connected to the output of said second adder.

2. An anti-jamming device as defined in claim 1 wherein said automatic gain control circuit each comprise a divider having a first input connected to the output of a second subtractor in the channel, a linear detector having an input connected to the first input of said divider, and an integrator connected between the output of said detector and a second input of said divider.

3. An anti-jamming device as defined in claim 1 wherein each correlation unit comprises first and second circuits each including a peak limiter, a switch between the output of said switch and having one input connected to the output of said peak limiter and an integrator connected one input of a multiplier, the other input of the multiplier being connected to the input of said peak limiter, a phase shifter being connected to the input of the peak limit in said first circuit and a third adder having respective inputs connected to the outputs of the multipliers in said first and second circuits, said one input of each correlation unit being connected to a second input of each of said switches of said first and second circuits thereof and other input being connected to the input of said phase shifter and the input of the peak limiter of said second circuit thereof.

4. An anti-jamming device as defined in claim 1 wherein each correlation unit comprises means responsive to a signal $u$ on said one input and a signal $\underline{m}$ on $\underline{\text{said}}$ other input for supplying an output $m,\overline{um} + m'.\overline{um'}$,$m'$ being the signal $m$ shifted in phase by $(\pi/2)$.

* * * * *

UNITED STATES PATENT OFFICE
CERTIFICATE OF CORRECTION

Patent No. 3,876,947 Dated April 8, 1975

Inventor(s) Claude Giraudon Page 1 of 2

It is certified that error appears in the above-identified patent and that said Letters Patent are hereby corrected as shown below:

Figure 4, should appear as shown on the attached sheet.

Signed and Sealed this

*twenty-fifth* Day of *May 1976*

[SEAL]

*Attest:*

RUTH C. MASON
*Attesting Officer*

C. MARSHALL DANN
*Commissioner of Patents and Trademarks*